United States Patent
Nagai et al.

(10) Patent No.: US 9,440,705 B2
(45) Date of Patent: Sep. 13, 2016

(54) BRAKE CALIPER

(71) Applicant: HONDA MOTOR CO., LTD., Minato-ku, Tokyo (JP)

(72) Inventors: Ryuichi Nagai, Wako (JP); Hirokatsu Nakaie, Wako (JP); Shinji Ito, Wako (JP); Hidetoshi Toyoda, Wako (JP); Shinji Kawasaki, Wako (JP); Yasumasa Matsui, Wako (JP)

(73) Assignee: Honda Motor Co. Ltd., Tokyo (JP)

( * ) Notice: Subject to any disclaimer, the term of this patent is extended or adjusted under 35 U.S.C. 154(b) by 0 days.

(21) Appl. No.: 14/416,400

(22) PCT Filed: May 22, 2013

(86) PCT No.: PCT/JP2013/064246
§ 371 (c)(1),
(2) Date: Jan. 22, 2015

(87) PCT Pub. No.: WO2014/050205
PCT Pub. Date: Apr. 3, 2014

(65) Prior Publication Data
US 2015/0203170 A1     Jul. 23, 2015

(30) Foreign Application Priority Data
Sep. 28, 2012  (JP) ................. 2012-218546

(51) Int. Cl.
*B62L 1/00*      (2006.01)
*F16D 55/22*    (2006.01)
(Continued)

(52) U.S. Cl.
CPC ............. *B62L 1/005* (2013.01); *B62L 3/023* (2013.01); *F16D 55/22* (2013.01); *F16D 55/226* (2013.01);
(Continued)

(58) Field of Classification Search
CPC .. F16D 65/18; F16D 16/567; F16D 2121/02; F16D 2121/14; F16D 2123/00
USPC ........ 188/72.3, 71.9, 196 D, 196 F, 196 BA, 188/106 F, 72.9
See application file for complete search history.

(56) References Cited

U.S. PATENT DOCUMENTS 3,638,763 A  *  2/1972  Laverdant ............... F16D 65/18
                                                        188/106 F
3,900,084 A       8/1975  Farr
(Continued)

FOREIGN PATENT DOCUMENTS

CA       1058532 A     7/1979
CN    201818678 U     5/2011
(Continued)

OTHER PUBLICATIONS

Search Report mailed Nov. 3, 2015 for corresponding European Application No. 13842883.4.
(Continued)

*Primary Examiner* — Robert A Siconolfi
*Assistant Examiner* — San Aung
(74) *Attorney, Agent, or Firm* — Carrier Blackman & Associates, P.C.; William D. Blackman; Jingli Wang

(57) ABSTRACT

A brake caliper includes: a caliper body which slidably houses a mechanically operated piston which presses a brake disc; a rotation cylinder member which is arranged alongside the mechanically operated piston, coaxially with the mechanically operated piston, and which is rotatably supported on the caliper body; a rotation arm which is fixed to the rotation cylinder member, and which rotates the rotation cylinder member by means of an operation of an operating element; a conversion mechanism which is provided between the rotation cylinder member and the mechanically operated piston, and which converts rotary motion of the rotation cylinder member into axial linear motion of the mechanically operated piston to thereby press and move the mechanically operated piston toward the brake disc side; and a return spring which biases the mechanically operated piston in a direction of moving away from the brake disc.

14 Claims, 8 Drawing Sheets

(51) Int. Cl.
   *F16D 65/18*      (2006.01)
   *F16D 65/46*      (2006.01)
   *B62L 3/02*       (2006.01)
   *F16D 55/226*     (2006.01)
   *F16D 125/36*     (2012.01)
   *F16D 55/00*      (2006.01)
   *F16D 125/34*     (2012.01)
   *F16D 121/14*     (2012.01)

(52) U.S. Cl.
   CPC ............ *F16D 65/18* (2013.01); *F16D 65/183* (2013.01); *F16D 65/46* (2013.01); *F16D 2055/0016* (2013.01); *F16D 2121/14* (2013.01); *F16D 2125/34* (2013.01); *F16D 2125/36* (2013.01)

(56) References Cited

U.S. PATENT DOCUMENTS

| | | | |
|---|---|---|---|
| 3,920,102 A | 11/1975 | Ito | |
| 5,060,765 A | 10/1991 | Meyer | |
| 5,123,505 A * | 6/1992 | Antony | F16D 65/567 188/196 D |
| 2002/0079172 A1 * | 6/2002 | Shaw | F16D 65/18 188/72.1 |
| 2004/0112690 A1 * | 6/2004 | Sekiguchi | F16D 65/18 188/72.7 |

FOREIGN PATENT DOCUMENTS

| | | |
|---|---|---|
| JP | 50-024671 A | 3/1975 |
| JP | 50-057151 U | 5/1975 |
| JP | 52067460 A * | 6/1977 |
| JP | 64-53648 U | 4/1989 |
| JP | 09-021433 A | 1/1997 |
| JP | 2007-146957 A | 6/2007 |

OTHER PUBLICATIONS

Taiwanese Office Action with a mailing date of Apr. 23, 2015 issued in the counterpart TW Patent Application 102118197 and the English translation thereof.
International Search Report of International Application PCT/JP2013/064246 with a mailing date of Aug. 20, 2013.
Search Report mailed Nov. 13, 2015 for corresponding European Application No. 13842883.4.

* cited by examiner

BRAKE CALIPER

TECHNICAL FIELD

The present invention relates to a brake caliper.

Priority is claimed on Japanese Patent Application No. 2012-218546, filed Sep. 28, 2012, the contents of which are incorporated herein by reference.

BACKGROUND ART

There is known a mechanical brake caliper which is provided with; a caliper body for housing a piston, and a rotation lever supported rotatably on the caliper body, and which, as a result of rotating the rotation lever, extends the piston so as to give a braking force to a brake disc.

For example, in the brake caliper disclosed in Patent Document 1, the piston is pressed via a conversion mechanism (ramp groove 22, cam bearing 23), which converts rotary motion of the rotation lever into linear motion, to thereby extend the piston. Moreover, in this brake caliper, within the caliper body, there is provided a return spring which biases the piston in the retracting direction.

DOCUMENT OF RELATED ART

Patent Document

[Patent Document 1] Japanese Unexamined Patent Application, First Publication No. 2007-146957

SUMMARY OF INVENTION

Problems to be Solved by the Invention

However, in a conventional brake caliper having a conversion mechanism for converting rotary motion to linear motion such as the one mentioned above, a number of members are arranged in the axial direction of the piston, and as a result, the dimension with respect to the piston axis becomes comparatively great.

Consequently, aspects of the present invention have an object of providing a brake caliper that is capable of making compact the dimension in the piston axial direction.

Means for Solving the Problem

As a means for solving the above problem, the present invention employs the following aspects.
(1) A brake caliper of an aspect of the present invention comprises: a caliper body which slidably houses a piston which presses a brake disc; a rotation cylinder member which is arranged alongside the piston, coaxially with the piston, and which is rotatably supported on the caliper body; a rotation arm which is fixed to the rotation cylinder member, and which rotates the rotation cylinder member by means of an operation of an operating element; a conversion mechanism which is provided between the rotation cylinder member and the piston, and which converts rotary motion of the rotation cylinder member into axial linear motion of the piston to thereby press and move the piston toward the brake disc side; and a return spring which is arranged coaxially with the rotation cylinder member, either on a radially inner side or a radially outer side of the rotation cylinder member, and which biases the piston in a direction of moving away from the brake disc.
(2) In the aspect of (1) above, the piston may be formed with a diameter greater than that of the rotation cylinder member, and on the radially outer side of the rotation cylinder member there may be provided a guide member which restricts rotation of the piston with respect to the caliper body, and which guides movement of the piston in the axial direction.
(3) In the aspect of (2) above, on an end portion of the rotation cylinder member on the piston side, there may be formed a flange portion which extends outward with respect to the radial direction, and on a surface of this flange portion which faces the piston side, there may be formed an action portion for causing the piston to perform linear motion; and an opposite side surface of the flange portion which faces the piston side may, within the caliper body, oppose a part of the caliper body, and between this one part and the opposite side surface there may be provided a thrust bearing.
(4) In the aspect of (3) above, the conversion mechanism may be such that: a rolling body is retained between a circumferential groove which is the action portion of the rotation cylinder member, and a circumferential groove formed in the piston; and at least either one of the circumferential groove formed in the rotation cylinder member and the circumferential groove formed in the piston, has a sloped surface which changes the groove depth with respect to a circumferential direction of the piston.
(5) In the aspect of either one of (2) and (3) above, the conversion mechanism may have a movable member which moves integrally with the piston when converting rotary motion of the rotation cylinder member into axial linear motion of the piston; and the piston and the movable member may be threadably coupled and thereby integrated, and an amount of projection of the piston toward the brake disc side with respect to the movable member may be adjusted by rotating the piston relatively to the movable member.
(6) In the aspect of (5) above, the conversion mechanism may be such that: a rolling body is retained between a circumferential groove which is the action portion of the rotation cylinder member, and a circumferential groove formed in the movable member; and at least either one of the circumferential groove formed in the rotation cylinder member and the circumferential groove formed in the movable member has a sloped surface which changes the groove depth with respect to a circumferential direction of the piston.
(7) In the aspect of either one of (4) and (6) above, the rolling body, the rotation cylinder member, and the return spring may be arranged in a manner so that at least part of the rolling body overlaps with the guide member in the radial direction of the piston.
(8) In the aspect of any one of (1) through (7) above, the return spring may be arranged on the inner side of the rotation cylinder member with respect to the radial direction.
(9) In the aspect of any one of (1) through (8) above, the operating element and the rotation arm may be connected by a wire, and there may be provided an adjustment mechanism which is capable of adjusting the length of the wire between the operating element and the rotation arm.

Advantage of Invention

According to the aspect of (1) above, since the return spring is arranged coaxially with the rotation cylinder member on either the inner side or the outer side of the rotation cylinder member, there is no need for providing a larger space for the return spring by separately extending it in the axial direction of the piston. As a result, it is possible to suppress the dimension of the caliper body in the piston axial direction. Thereby, it is possible to make compact the dimension in the piston axial direction.

In the case of (2) above, the guide member which restricts rotation of the piston with respect to the caliper body can be provided on the radially outer side of the rotation cylinder member. Therefore it is possible to compactly provide the guide member. As a result, operability can be improved.

In the case of (3) above, the flange portion is formed on the rotation cylinder member and the thrust bearing is compactly provided to take advantage of both of the surfaces of this flange portion. Therefore, smooth rotation of the rotation cylinder member is possible, and as a result, operability can be improved.

In the case of (4) above, thickness can be suppressed by configuring the conversion mechanism with grooves and a rolling body.

In the case of (5) above, it is possible to perform position adjustment of the piston with respect to the axial direction. Therefore operability can be improved.

In the case of (6) above, thickness can be suppressed by configuring the conversion mechanism with grooves and a rolling body.

In the case of (7) above, several members for operability improvement are consolidated in the radial direction of the piston, and as a result, compactification can be achieved while ensuring superior operability.

In the case of (8) above, the return spring can be protected with the rotation cylinder member, and excellent outer appearance can also be achieved.

In the case of (9) above, the amount of play of the wire can be adjusted from the brake caliper side. Therefore, operability can be improved.

DESCRIPTION OF EMBODIMENTS

Hereunder, embodiments of the present invention are described, with reference to the figures.

In the figures used in the following description, the arrow FR denotes vehicle front side, the arrow UP denotes vehicle upper side, and the arrow LH denotes vehicle left side. Moreover, in the following description, the orientations of the brake caliper according to the embodiments of the present invention and the members that constitute the brake caliper are described on the basis of vehicle orientation in some cases. However, the orientation of the brake caliper of the present invention is not limited to the orientation that is described in the embodiments.

<First Embodiment>

Figure 1:
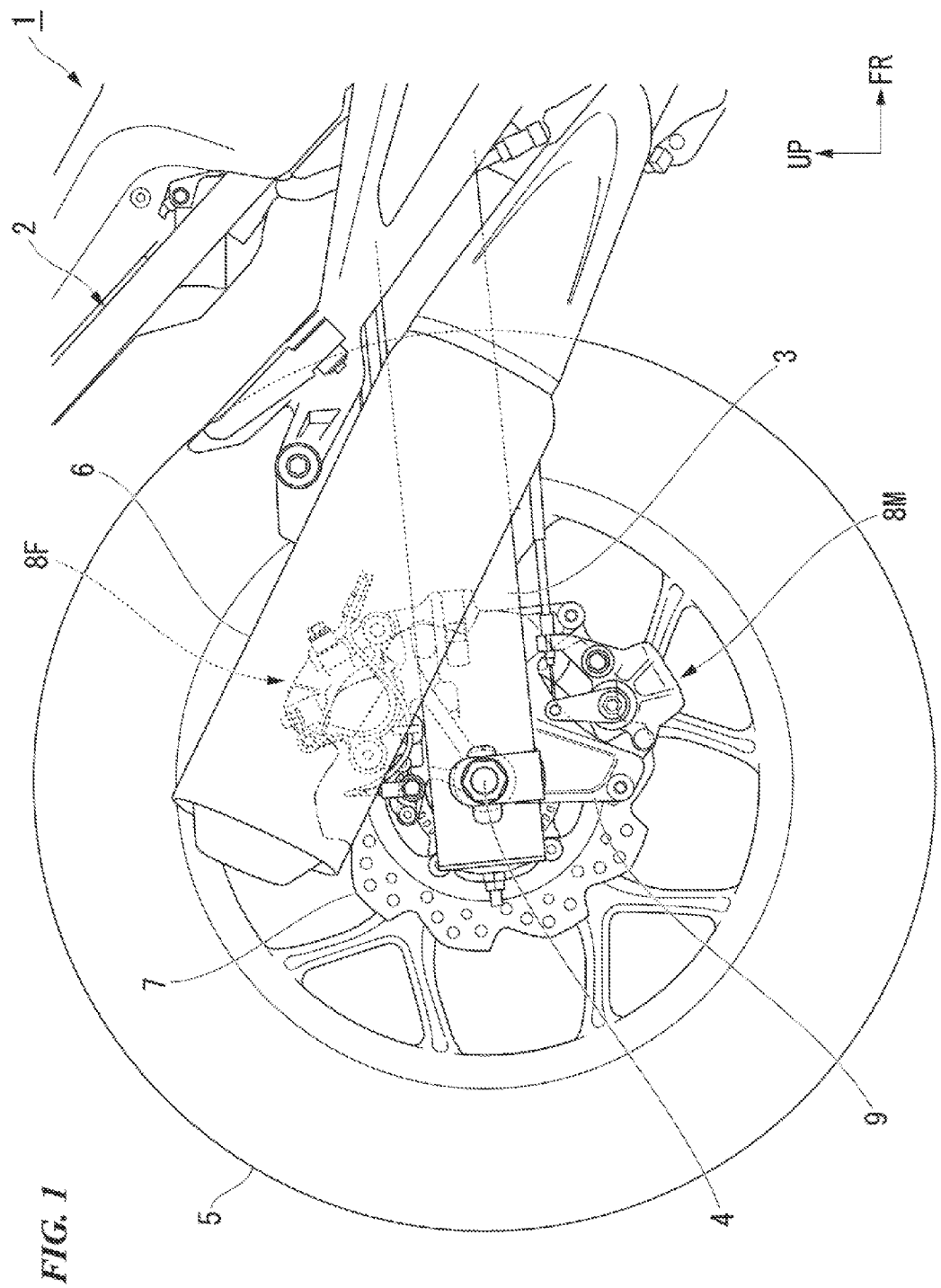
FIG. 1 is a side view of a rear portion of a straddle type vehicle which is provided with a brake caliper according to a first embodiment of the present invention.

FIG. 1 shows a rear portion a motorcycle 1, which is taken as an example of a straddle type vehicle that is provided with a brake caliper according to a first embodiment of the present invention. In this figure, reference symbol 2 denotes a vehicle frame, and on the vehicle frame 2, there is supported, in a manner that allows swinging in the up-down direction, the front portion of a pair of left and right swing arms 3 that extend backward. A rear axle 4 spans across at the rear portion of the left and right swing arms 3, and on the rear axle 4 there is rotatably supported a rear wheel 5. Moreover, on the right hand side of the swing arm 3 there is arranged a muffler 6.

In the center of the rear wheel 5 there is provided a brake disc 7 which rotates integrally with the rear wheel 5. The brake disc 7 is sandwiched by a hydraulic brake caliper 8F or a mechanical brake caliper 8M, and it thereby gives a braking force to the rear wheel 5. Making reference also to FIG. 2, on the rear portion inner side of the right swing arm 3 there is fixed a plate-shaped caliper bracket 9 that extends in the up-down direction. The hydraulic brake caliper 8F is supported on the upper portion of the caliper bracket 9, and the mechanical brake caliper 8M is supported on the lower portion of the caliper bracket 9. The hydraulic brake caliper 8F and the mechanical brake caliper 8M swing integrally with the swing arm 3. As shown in FIG. 1, the hydraulic brake caliper 8F is positioned on the inner side of the muffler 6 with respect to the vehicle widthwise direction. Moreover, in FIG. 2, for the sake of convenience of description, the outline of the caliper bracket 9 is shown with thick solid lines or broken lines, and in FIG. 1 and FIG. 2, for the sake of convenience of description, the portion of the outline that does not appear in the outer appearance of the brake disc 7 is shown with two-dot chain lines.

The hydraulic brake caliper 8F is provided with a caliper body 10F that is supported so as to be able to move along the vehicle widthwise direction with respect to the caliper bracket 9 only by a predetermined distance, and the mechanical brake caliper 8M is provided with a caliper body 10M that is supported so as to be able to move along the vehicle widthwise direction with respect to the caliper bracket 9 only by a predetermined distance. The caliper body 10F houses, in a manner of allowing it to slide in the vehicle widthwise direction, a hydraulically operated piston 12 that presses the brake disc 7, and the caliper body 10M houses, in a manner of allowing it to slide in the vehicle widthwise direction, a mechanically operated piston 13 that presses the brake disc 7. In the present embodiment, the axial direction of each of the pistons 12 and 13 is parallel with the vehicle widthwise direction.

Figure 2:
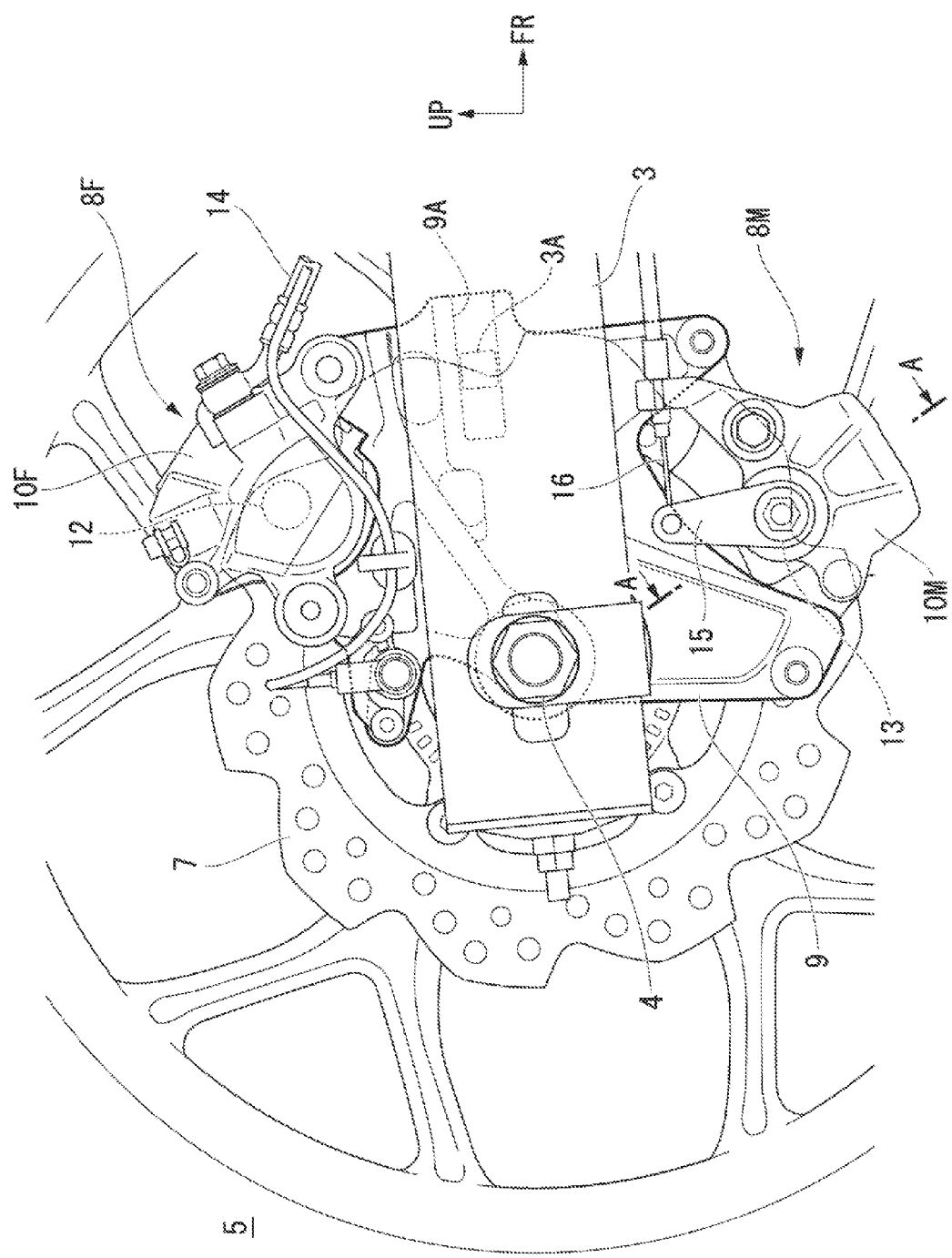
FIG. 2 is a side view of the brake caliper according to the first embodiment in a state of being provided at the rear portion of the straddle type vehicle.

Here, in FIG. 2, reference symbol 9A denotes a swing arm engagement recess portion 9A in the caliper bracket 9 that is formed in a portion positioned in front of the rear axle 4 and on the inner side of the swing arm 3. This swing arm engagement recess portion 9A is positioned below the hydraulic brake caliper 8F and above the mechanical brake caliper 8M, and between the hydraulic brake caliper 8F and the mechanical brake caliper 8M. The swing arm engagement recess portion 9A, in cooperation with the rear axle 4, swingably supports the caliper bracket 9 by engaging with a protrusion portion 3A provided on the swing arm 3. Incidentally, the rear portion of the caliper bracket 9 supports and has the rear axle 4 inserted therethrough.

To the caliper body 10F of the hydraulic brake caliper 8F there is connected a brake hose 14 for supplying pressurized fluid to a cylinder (not shown in the figure) which houses the hydraulically operated piston 12. The hydraulically operated piston 12 operates according to the fluid pressure caused by the pressurized fluid supplied from the brake hose 14. To describe in detail, when pressurized fluid is supplied into the cylinder via the brake hose 14, the hydraulically operated piston 12 is propelled to the brake disc 7 side and presses the brake disc 7 via a brake pad (omitted in the figure).

In the present embodiment, the brake hose 14 is connected from the caliper body 10F to a master cylinder (not shown in the figure) which is provided at the center lower portion of the motorcycle 1. By means of an operation performed with a foot pedal swingably supported in the vicinity of the master cylinder, the pressurized fluid within the master cylinder is supplied to the caliper body 10F via the brake hose 14. The hydraulic brake caliper 8F, in the present embodiment, is used for normal braking at the time of traveling.

Figure 3:
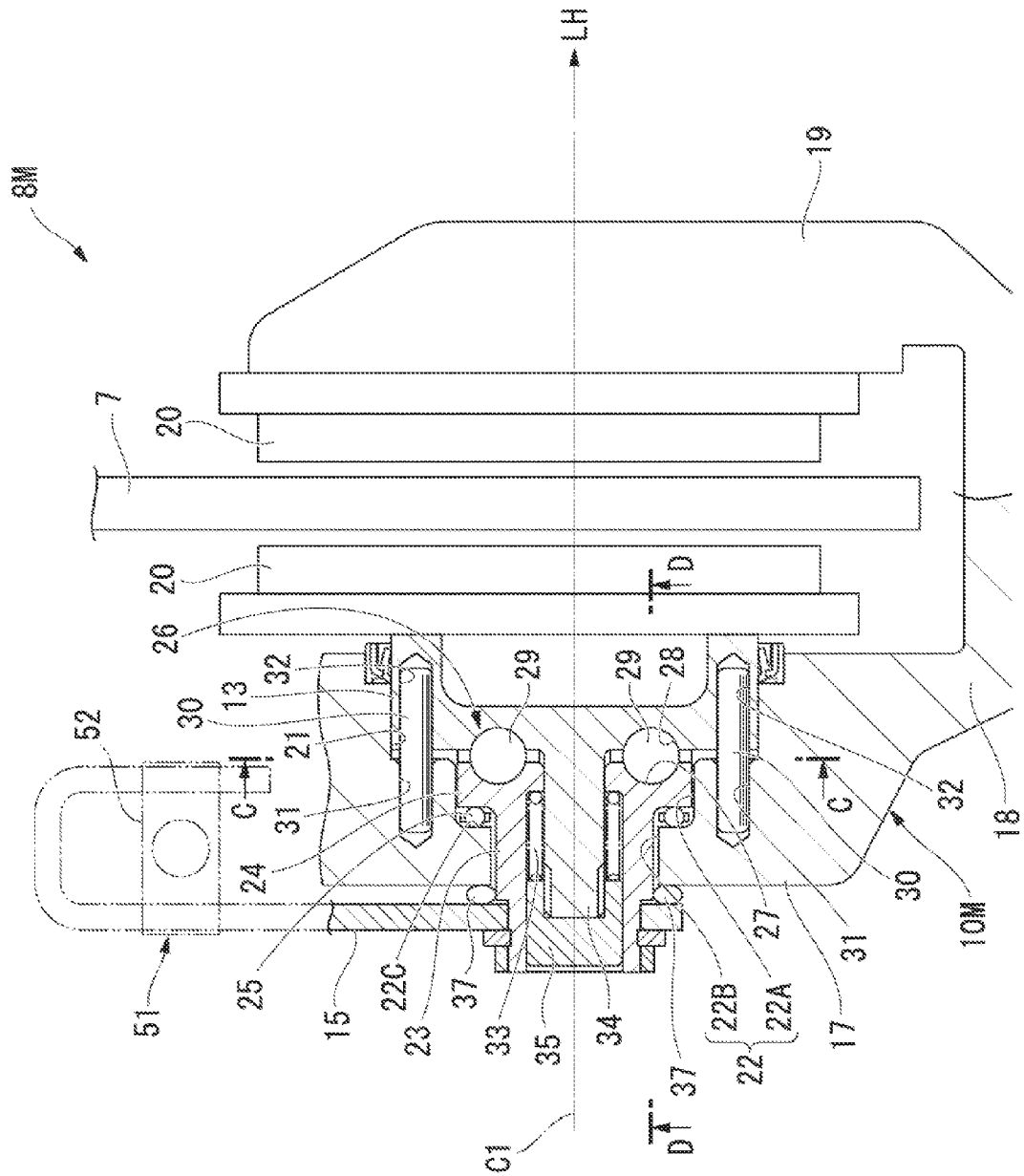
FIG. 3 is a cross sectional view taken along the line A-A of FIG. 2.

On the other hand, on the vehicle widthwise outer side wall portion of the caliper body 10M of the mechanical brake caliper 8M, there is rotatably supported a rotation arm 15 that extends upward, and to the tip end portion of the rotation arm 15 there is connected a brake wire 16. The brake wire 16 has its one end connected to the rotation arm 15, and the other end thereof is connected to a brake lever, which is an operating element (not shown in the figure) and which is provided at an appropriate location of the vehicle such as the steering bar. As a result of this brake lever being operated, it is pulled and rotates the rotation arm 15. In the present embodiment, as shown in FIG. 3, the rotation arm 15 extends from the caliper body 10M and is then bent so as to turn back. The brake wire 16 is connected to this bent tip end portion.

The mechanical brake caliper 8M is such that as the brake wire 16 is pulled and the rotation arm 15 is rotated, the mechanically operated piston 13 is propelled to the brake disc 7 side, and presses the brake pad via the brake disc 7 (not shown in the figure).

In the present embodiment, the brake lever is configured so that it is releasably retained at a position where the brake wire 16 has been pulled only by a predetermined amount so that the mechanically operated piston 13 can maintain the state of pressing the brake disc 7. As such the mechanical brake caliper 8M configures a parking brake mechanism. Moreover, the brake lever is biased so that when the state of being retained at the position where the brake wire 16 has been pulled by means of the operation only by the predetermined amount is released, it returns to the state prior to this operation, and when the above state is released, the rotation arm 15 also returns to the pre-rotation state.

Here, return of the rotation arm 15 to the pre-rotation state is performed by a return spring 33, details of which are described later. Furthermore, the pre-rotation state of the rotation arm 15 is hereunder referred to as initial position.

Making reference to FIG. 3, there is shown a cross-section of the mechanical brake caliper 8M taken along the line A-A. In the mechanical brake caliper 8M, the caliper body 10M is integrally provided with: a body main body 17 that houses the mechanically operated piston 13 and that is arranged on the vehicle widthwise outer side of the brake disc 7; a bridge portion 18 that extends from the body main body 17 so as to straddle the brake disc 7; and an inner side contact portion 19 that extends from the bridge portion 18 toward the center of the brake disc 7, and that opposes the body main body 17 across the brake disc 7. Between the body main body 17 and the inner side contact portion 19 there are arranged a pair of left and right brake pads 20 so as to be on either side of the brake disc 7. These brake pads 20 are supported at appropriate positions of the caliper body 10M and are able to move along the axial direction of the mechanically operated piston 13. In the figure, reference symbol C1 denotes the center axis line of the mechanically operated piston 13, and the direction along this center axis line C1 is the axial direction of the mechanically operated piston 13.

In the body main body 17 there is formed a cylinder 21 that is formed as a hole from the wall portion of the body main body 17, which opposes the brake disc 7 across the right brake pad 20, and that extends toward the vehicle widthwise outer side. This cylinder 21 houses the mechanically operated piston 13. The mechanically operated piston 13 is formed in a bottom-ended cylindrical shape. In the present embodiment, the mechanically operated piston 13 is housed within the cylinder 21 in a manner such that the opening end portion thereof faces the brake disc 7 side.

Here, in the body main body 17, there is formed a cross-sectionally circular-shaped cylinder member housing chamber 22 that extends vehicle widthwise outward from the bottom portion of the cylinder 21 and that opens to the outside of the body main body 17. In this cylinder member housing chamber 22 there is housed a rotation cylinder member 23 that is arranged coaxially with the mechanically operated piston 13 and alongside the mechanically operated piston 13. This rotation cylinder member 23 can rotate about the axial center within the cylinder member housing chamber 22, and is rotatably supported on the caliper body 10M.

The rotation cylinder member 23 is such that the end portion on the vehicle widthwise outer side projects from the vehicle widthwise outer opening edge of the cylinder member housing chamber 22, and the rotation arm 15 is fixed on this projecting end portion. That is to say, the rotation cylinder member 23 rotates by rotating the rotation arm 15.

The cylinder member housing chamber 22 is formed in a counter-bore shape in which a major diameter portion 22A that extends vehicle widthwise outward from the bottom portion of the cylinder 21 and that is smaller in diameter than the cylinder 21, and a minor diameter portion 22B that extends vehicle widthwise outward from the major diameter portion 22A and that is smaller in diameter than the major diameter portion 22A, communicate with each other. In the rotation cylinder member 23, at the vehicle widthwise inner side end portion, there is formed a flange portion 24 that extends inward and outward in the radial direction thereof, and the rotation cylinder member 23 is housed in the cylinder member housing chamber 22 so that this flange portion 24 is positioned within the major diameter portion 22A.

The surface of the radially outward extending portion of the flange portion 24 that faces the vehicle widthwise outer side opposes a wall portion 22C that is formed between the major diameter portion 22A and the minor diameter portion 22B, and a thrust bearing 25 is provided between this wall portion 22C and the vehicle widthwise outward facing surface of the flange portion 24.

Moreover, at the opening edge portion on the vehicle widthwise outer side of the cylinder member housing chamber 22, there is provided a ring-shaped seal member 37. The seal member 37 is in contact, in the axial direction of the rotation cylinder member 23, with the base end portion of the rotation arm 15, and it restricts movement of the rotation cylinder member 23 toward the vehicle widthwise inner side. Accordingly, the rotation cylinder member 23 rotates within the cylinder member housing chamber 22 in a state where movement thereof in the axial direction is restricted.

The surface of the flange portion 24 of the rotation cylinder member 23, which faces the vehicle widthwise inner side, opposes the bottom portion of the mechanically operated piston 13. Between the flange portion 24 and the mechanically operated piston 13 there is configured a conversion mechanism 26 that converts rotary motion of the rotation cylinder member 23 into axially linear motion of the mechanically operated piston 13, and that presses and extends the mechanically operated piston 13 toward the brake disc 7 side.

Figure 8A:
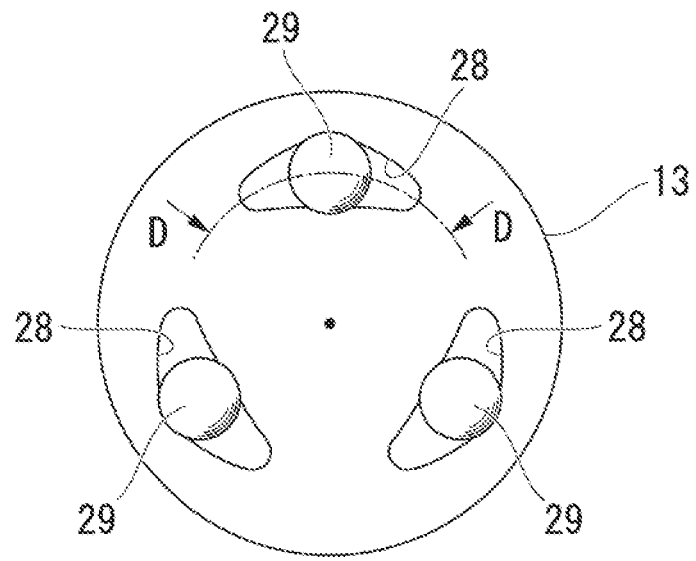
FIG. 8A is an auxiliary view of a piston seen along the arrow line C-C of FIG. 3.
Figure 8B:
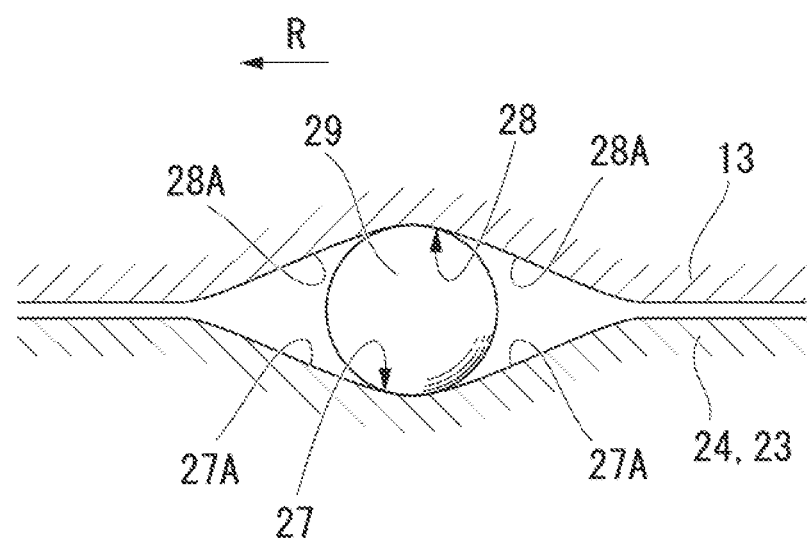
FIG. 8B is a cross sectional view taken along the line D-D of FIG. 8A and FIG. 3.

In the present embodiment, this conversion mechanism 26 employs a so-called cam bearing mechanism which utilizes the commonly known cam effect. Specifically, the conversion mechanism 26 of the present embodiment is such that, on the respective bottom portions of the flange portion 24 of the rotation cylinder member 23, and the mechanically operated piston 13, between a flange side groove 27 and a piston side groove 28 formed concentrically with the center of the mechanically operated piston 13, there is retained rolling bodies 29. Also, making reference to FIG. 8A and FIG. 8B, in the present embodiment, the flange side groove 27 and the piston side groove 28 are formed in a sloped shape having sloped surfaces (27A, 28A) the depth of which continuously changes with respect to the circumferential direction of the mechanically operated piston 13. Incidentally, in FIG. 8B, the arrow R denotes the circumferential direction that circles around the center axis line C1. Moreover, the flange side groove 27 and the piston side groove 28 are formed in a circumferential shape when cut on the plane along the radial direction of the piston 13, so as to retain the rolling body 29. FIG. 8B is a cross-sectional view of the arc plane that includes the line D-D in FIG. 3 and FIG. 8A.

Several of the flange side grooves 27 and the piston side grooves 28 are formed at intervals in the respective bottom portions of the flange portion 24 of the rotation cylinder member 23, and the mechanically operated piston 13, and a single rolling body 29 is retained separately in each of the several flange side grooves 27 and the piston side grooves 28.

In this conversion mechanism 26, as a result of the rolling body 29 present at the deep portion of the flange side groove 27 corresponding to the action portion gradually coming in contact with the shallow portion of the piston side groove 27 as rotation of the rotation cylinder member 23 progresses, the rolling body 29 can move to the mechanically operated piston 13 side and press the mechanically operated piston 13. In the present embodiment, the flange side groove 27 of the flange portion 24 and the piston side groove 28 of the bottom portion of the mechanically operated piston 13 are each provided as grooves of a circumferentially sloped shape. However, either one of the flange side groove 27 and the piston side groove 28 may be provided in a sloped shape, and the other one may be provided simply as a groove for retaining the rolling body 29. In this example, the flange side groove 27 and the piston side groove 28 are each provided as a groove of a circumferentially sloped shape. Therefore friction between the rolling body 29 and the flange side groove 27 and the piston side groove 28 can be suppressed further. Moreover, also in the second and third embodiments described later, a conversion mechanism similar to the conversion mechanism 26 is described. The conversion mechanisms in these second and third embodiments are also configured with a rolling body 29, a flange side groove 27, and a piston side groove 28 similar to those in the first embodiment.

Furthermore, returning to FIG. 3, in the body main body 17, a plurality of guide members 30, which restrict rotation of the mechanically operated piston 13 with respect to the body main body 17 and which guide axial movement of the mechanically operated piston 13, are provided on the radially outer side of the rotation cylinder member 23.

These guide members 30, at the outer circumference portion of the bottom portion of the cylinder 21, are fixed by having one end portion side thereof inserted into a plurality of retention holes 31 that are formed at intervals around the circumferential direction of the cylinder 21. The other end portion side of the guide member 30 is slidably inserted into an engagement hole 32 formed from the bottom portion of the mechanically operated piston 13 into the circumferential wall portion.

On the radially inner side of the rotation cylinder member 23 there is provided the return spring 33 that is arranged coaxially with this rotation cylinder member 23 and that biases the mechanically operated piston 13 in the retracting direction (in the direction of moving away from the brake disc 7).

The return spring 33 has its one end in contact with the portion of the flange portion 24 of the rotation cylinder member 23 that extends radially inward, and has the other end in contact with an engagement projection portion 34 that projects vehicle widthwise outward from the bottom portion center of the mechanically operated piston 13 and that is inserted into the inner side of the rotation cylinder member 23.

To describe in detail, the engagement projection portion 34 passes through the radially inner side of the flange portion 24 and extends vehicle widthwise outward, and on the tip end thereof there is attached a cap 35 with a diameter greater than that of the engagement projection portion 34. The other end of the return spring 33 mentioned above is in contact with a surface of the cap 35 facing the flange portion 24 side. The return spring 33 contracts when the mechanically operated piston 13 is propelled to the brake disc 7 side, and accumulates a biasing force in the direction so as to retract the mechanically operated piston 13 away from the brake disc 7.

Here, in the mechanical brake caliper 8M of the present embodiment, these rolling body 29, rotation cylinder member 23, and return spring 33 are arranged so that at least part of the rolling body 29 overlaps with the guide member 30 with respect to the radial direction of the mechanically operated piston 13.

Figure 4:
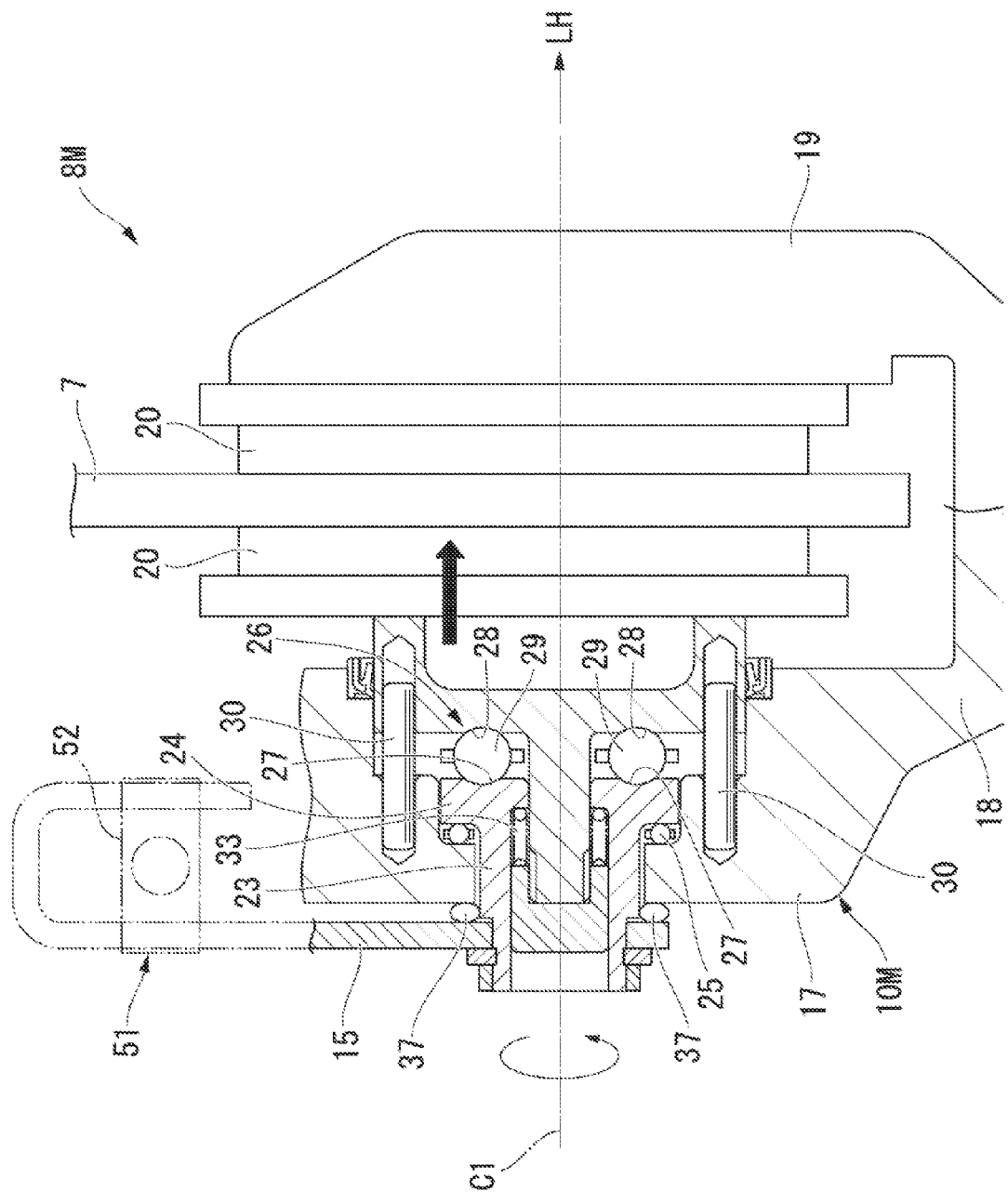
FIG. 4 is a diagram for describing operations of the brake caliper according to the first embodiment.

In the mechanical brake caliper 8M described above, when the brake wire 16 is pulled by the brake lever (not shown in the figure) which is provided in an appropriate position of the vehicle, and the rotation arm 15 is rotated from the initial position, then as shown in FIG. 4, the rotation cylinder member 23 rotates and the mechanically operated piston 13 is pressed by the conversion mechanism 26 and propelled toward the brake disc 7 side, pressing the brake disc 7 via the brake pad 20. As a result, braking force is given to the brake disc 7. Then when the operation of the brake lever is released, the mechanically operated piston 13 is retracted by the return spring 33.

In the mechanical brake caliper 8M according to the embodiment described above, the return spring 33 is arranged coaxially with the rotation cylinder member 23 on the inner side of the rotation cylinder member 23. Therefore there is no need for providing a larger space for the return spring 33 by separately extending it in the axial direction of the mechanically operated piston 13. As a result, it is possible to suppress the dimension of the caliper body 10M in the axial direction of the mechanically operated piston 13. Thereby, it is possible to make compact the dimension in the axial direction of the mechanically operated piston 13. The return spring 33 can be protected by the rotation cylinder member 23, and excellent outer appearance can also be achieved.

In the present embodiment, the conversion mechanism 26 is configured with the grooves (flange side groove 27 and piston side groove 28) and the rolling body 29 to suppress the thickness, and the guide member 30 that restricts rotation of the mechanically operated piston 13 with respect to the caliper body 10M is provided on the radially outer side of the rotation cylinder member 23. As a result it is possible to compactly provide the guide member 30 and achieve smooth operation of the mechanically operated piston 13. Hence operability can be improved.

In the present embodiment, the flange portion 24 is formed on the rotation cylinder member 23, and the thrust bearing 25 is compactly provided to take advantage of the side and base surfaces of this flange portion 24. Therefore, smooth rotation of the rotation cylinder member 23 is possible, and operability can be improved.

Moreover, in the present embodiment, in the radial direction of the mechanically operated piston 13, the guide member 30, the rolling body 29, the rotation cylinder member 23, and the return spring 33 are consolidated. As a result, overall compactification can be achieved while ensuring superior operability.

<Second Embodiment>

Hereunder, a second embodiment of the present invention is described with reference to FIG. 5. In the present embodiment, the configuration corresponding to the mechanically operated piston 13 and the conversion mechanism 26 in the mechanical brake caliper 8M of the first embodiment differs from that of the first embodiment. In the present embodiment, the same constituents as those in the first embodiment are denoted by the same reference symbols, and descriptions thereof are omitted.

Figure 5:
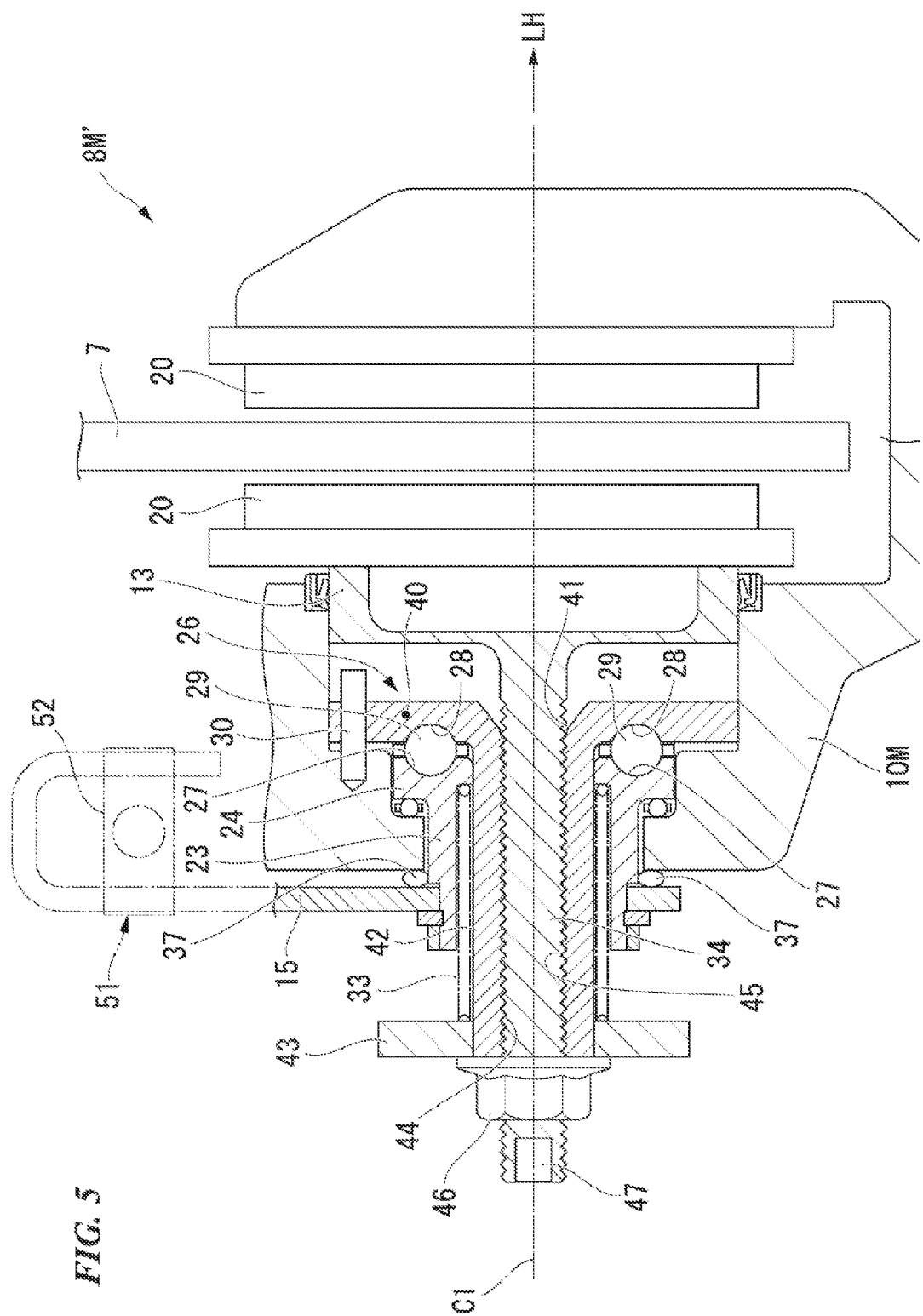
FIG. 5 is a cross sectional view for describing a brake caliper according to a second embodiment of the present invention.

Making reference to FIG. 5, first, in the mechanical brake caliper 8M' of the present embodiment, the conversion mechanism 26 is configured such that a rolling body 29 is retained by a flange side groove 27 that is formed in the flange portion 24 of the rotation cylinder member 23, and a piston side groove 28 that is formed in a circular plate-shaped conversion plate 40 arranged within the cylinder 21, between the bottom portion of the mechanically operated piston 13 and the flange portion 24.

The shapes of the flange side groove 27 and the piston side groove 28 are similar to those in the first embodiment.

The conversion plate 40 is housed within the cylinder 21 so as to be able to slide in the axial direction of the mechanically operated piston 13, and a guide member 30 passes through the outer circumferential portion thereof. Here, in the present embodiment, the guide member 30 restricts rotation of the conversion plate 40 and only restricts axial movement of the mechanically operated piston 13, and is not inserted in the mechanically operated piston 13. However, as it becomes apparent in the description later, the mechanically operated piston 13 and the conversion plate 40 move integrally. Therefore rotation is indirectly restricted and guided by the guide member 30.

In the center of the conversion plate 40 there is formed an opening 41 that passes therethrough in the axial direction of the piston 13, and from the circumferential edge portion of the opening 41 there is formed a projection cylinder portion 42 that projects vehicle widthwise outward. This projection cylinder portion 42 projects outward with respect to the vehicle widthwise direction so as to pass the inner side of the rotation cylinder member 23. On the tip end portion of the projection cylinder portion 42 there is provided a flange portion 43 that extends outward with respect to the radial direction thereof. In the present embodiment, a return spring 33 is provided between the spring receiving flange portion 43 and the flange portion 24 of the rotation cylinder member 23. Moreover, on the inner circumferential surface of the projection cylinder portion 42 there is formed a female threaded portion 44.

On the outer circumferential surface of the engagement projection portion 34 of the mechanically operated piston 13 there is formed a male threaded portion 45, and the engagement projection portion 34 is inserted in the projection cylinder portion 42 in a state of the male threaded portion 45 being threadably engaged with the female threaded portion 44. As a result, in the present embodiment, by rotating the mechanically operated piston 13 relative to the conversion plate 40, the mechanically operated piston 13 can be moved in the axial direction relatively to the conversion plate 40. Furthermore, the engagement projection portion 34 projects vehicle widthwise outward from the projection cylinder portion 42, and on the outer circumferential surface of the tip end portion of the engagement projection portion 34 projecting from the projection cylinder portion 42, there is screwed a positioning nut 46. The positioning nut 46 is in contact with the spring receiving flange portion 43.

Moreover, on the tip end of the engagement projection portion 34 of the mechanically operated piston 13 there is formed a tool socket 47 for inserting therein a tool for rotating the mechanically operated piston 13 with respect to the conversion plate 40.

In the mechanical brake caliper 8M' of the above configuration, when the rotation arm 15 is rotated from the initial position, the rotation cylinder member 23 rotates and the conversion plate 40 of the conversion mechanism 26 is pressed and propelled to the brake disc 7 side. At this time, since the projection cylinder portion 42 of the conversion plate 40 and the engagement projection portion 34 of the mechanically operated piston 13 are threadably engaged and integrated, then as the conversion plate 40 is propelled, the mechanically operated piston 13 is propelled and presses the brake disc 7 via the brake pad 20. Thereby, a braking force is given to the brake disc 7.

At this time, the spring receiving flange portion 43 relatively approaches the flange portion 24 of the rotation cylinder member 23, and therefore, the return spring 33 is contracted.

Then upon releasing the state of the rotation arm 15 being retained in the state of having been rotated, the mechanically operated piston 13 is retracted by the return spring 33, and the rotation arm 15 returns to the initial position also.

Furthermore, in this mechanical brake caliper 8M', by inserting a tool into the tool socket 47 in the tip end of the engagement projection portion 34, and rotating the mechanically operated piston 13 relatively to the conversion plate 40, the axial position of the mechanically operated piston 13 relative to the conversion plate 40 can be adjusted regardless of rotation of the rotation cylinder member 23.

In this case, for the mechanically operated piston 13, the distance from the conversion plate 40 changes with respect to the state prior to adjustment. However, since the projection cylinder portion 42 of the conversion mechanism 40 and the engagement projection portion 34 of the mechanically operated piston 13 are threadably engaged and integrated, it is possible to receive a constant conversion amount of linear motion converted by the conversion mechanism 26 with respect to the rotation of the rotation cylinder member 23 regardless of the position relative to the conversion plate 40.

That is to say, in the present embodiment, when converting rotary motion of the rotation cylinder member 23 into axially linear motion of the mechanically operated piston 13, the conversion mechanism 26 includes the conversion plate 40 which is a movable member that moves integrally with the mechanically operated piston 13, and the mechanically operated piston 13 and the conversion plate 40 are integrated by means of threadable engagement. Moreover, by rotating the mechanically operated piston 13 relatively to the conversion plate 40, it is possible to adjust the amount of projection of the mechanically operated piston 13 to the brake disc 7 side with respect to the conversion plate 40.

As a result, in the mechanical brake caliper 8M' of the present embodiment, even in the case where the brake pad 20 wears out, by adjusting the position of the mechanically operated piston 13 it is possible to give an appropriate level of braking force to the brake disc 7, and improve operability.

<Third Embodiment>

Next, a third embodiment of the present invention is described with reference to FIG. 6 and FIG. 7. The present embodiment is similar to the second embodiment in the point that position can be adjusted with respect to the piston axial direction. However, the arrangement and configuration of the return spring 33 differ from those of the second embodiment, and the shape of the spring receiving flange portion 43 also differs from that of the second embodiment. In the present embodiment, the same constituents as those in the first and second embodiments are denoted by the same reference symbols, and descriptions thereof are omitted.

Figure 6:
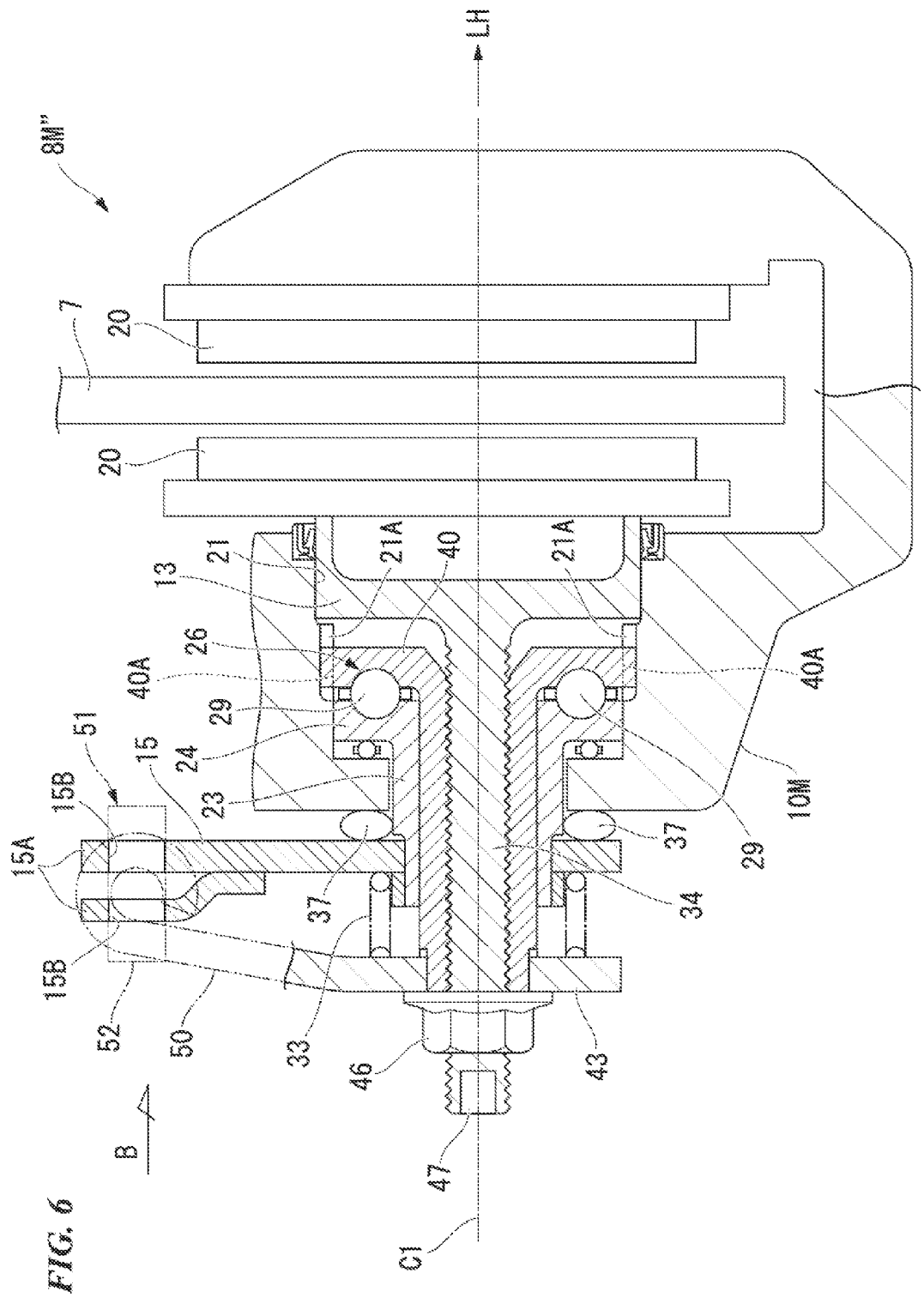
FIG. 6 is a cross sectional view for describing a brake caliper according to a third embodiment of the present invention.

Making reference to FIG. 6, first, in the mechanical brake caliper 8M" of the present embodiment, the return spring 33 is arranged coaxially with the rotation cylinder member 23, on the radially outer side of the rotation cylinder member 23. To describe in detail, the return spring 33 has its one end in contact with the rotation arm 15, and its other end in contact with the spring receiving flange portion 43.

Moreover, on the spring receiving flange portion 43 there is integrally formed an arm portion 50 that projects radially outward, and the tip end of the arm portion 50 is bent and exhibits a circular shape. By grasping the tip end portion of this type of arm portion 50, the operator can easily perform a rotation operation of an adjustment nut 46 for example. The figure illustrates the tip end of the arm portion 50 as though it is positioned in the upper portion of the rotation arm 15 and overlaps with the rotation arm 15, however, these are not connected.

Moreover, in the present embodiment, a plurality of radially inward-depressed engagement grooves 40A are formed, in a manner of being lined around the circumferential direction at intervals, in the outer circumferential portion of the conversion plate 40. On the other hand, on the inner circumferential surface of the cylinder 21 there is formed engagement projection portions 21A that engage with the engagement grooves 40A so as to extend along the axial direction of the mechanically operated piston 13. The engagement projection portions 21A restrict rotation of the conversion plate 40, while guiding the conversion plate 40 in the axial direction of the mechanically operated piston 13.

Moreover, the rotation arm 15 differs from those in the first and second embodiments in the shape of the tip end portion. On this tip end portion there is formed a bifurcated engagement portion 15A, and a brake wire 16 (refer to FIG. 1) is connected to the engagement portion 15A. In the present embodiment there is provided an adjustment mechanism 51 that is capable of adjusting the length of the brake wire 16 between a brake lever, which is an operating element, provided in an appropriate position of the vehicle, and the rotation arm 15. In FIG. 6, for the sake of convenience of description, the adjustment mechanism 51 is shown with two-dot chain lines.

Figure 7:
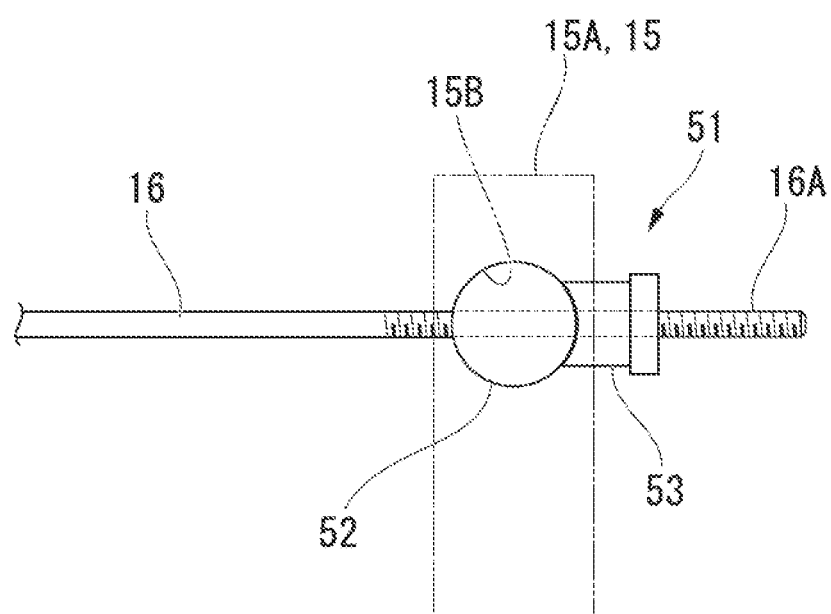
FIG. 7 is a diagram of an adjustment mechanism seen in the direction of arrow B of FIG. 6.

Here, making reference to FIG. 7, connection between the brake wire 16 and the engagement portion 15A and the adjustment mechanism 51 are described. The brake wire 16 has, on the tip end portion thereof, a rod portion 16A having a male threaded portion formed thereon. On the other hand, respectively in the opposing portions of the bifurcated engagement portion 15A, there is formed a through hole 15B, and in these through holes 15 there is inserted a column-shaped latching member 52, which is a member of the adjustment mechanism 51, in a bridging manner.

The rod portion 16A passes through the latching member 52, and an adjustment nut 53 is screwed on the rod portion 16A that has passed through. The adjustment nut 53 is in contact with the latching member 52 and is latched on the latching member 52. Here, in the present embodiment, the adjustment mechanism 51 is configured with the latching member 52 and the adjustment nut 53. In this type of adjustment mechanism 51, by screwing the adjustment nut 53 to the latching member 52 side, the brake wire 16 can be pulled, and by rotating the adjustment nut 53 in the direction to come off from the rod portion 16A, tension of the brake wire 16 can be mitigated.

The portion of the adjustment nut 53 that is in contact with the latching member 52 side is formed in an arc shape around the circumferential surface of the latching member 52.

In this type of mechanical brake caliper 8M" of the present embodiment, the amount of play of the brake wire 16 can be adjusted from the mechanical brake caliper 8M" side. Therefore operability can be improved. That is to say, it is possible to adjust the amount of projection of the mechanically operated piston 13 from the caliper body 10M.

The embodiments of the present invention have been described. However, the present invention is not limited to the embodiments, and various modifications may be made without departing from the scope of the invention. For example, as shown with two-dot chain lines in FIG. 3 through FIG. 5, an adjustment mechanism 51 described in the third embodiment may be added in the first embodiment and the second embodiment.

In the mechanical brake caliper 8M' and the mechanical brake caliper 8M" of the second and third embodiments, the position of the mechanically operated piston 13 relative to the conversion mechanism 26 can be adjusted. Therefore, the amount of projection of the mechanically operated piston 13 from the caliper body 10M can be suitably adjusted without providing an adjustment mechanism 51. Moreover it is effective to provide an adjustment mechanism 51 in a configuration that is not capable of making adjustment to the position of the mechanically operated piston 13 relative to the conversion mechanism 26, as in the configuration of the first embodiment.

DESCRIPTION OF REFERENCE SYMBOLS

1 Motorcycle (straddle type vehicle)
7 Brake disc 8M, 8M', 8M" Mechanical brake caliper (brake caliper)
10M Caliper body
13 Mechanically operated piston (piston)
15 Rotation arm
16 Brake wire (wire)
23 Rotation cylinder member
24 Flange portion
25 Thrust bearing
26 Conversion mechanism
27 Flange side groove (groove, action portion)
28 Piston side groove (groove)
29 Rolling body
30 Guide member
33 Return spring
40 Conversion plate (movable member)
41 Opening
42 Projection cylinder portion
44 Female threaded portion
45 Male threaded portion
46 Positioning nut
51 Adjustment mechanism

The invention claimed is:

1. A brake caliper comprising:
a caliper body which slidably houses a piston configured to press a brake pad toward a brake disc;
a rotation cylinder member which is arranged alongside the piston, coaxially with the piston, and which is rotatably supported on the caliper body;
a rotation arm which is fixed to the rotation cylinder member, and which is configured to rotate the rotation cylinder member by operation of an operating element;
a conversion mechanism which is provided between the rotation cylinder member and the piston, and which is configured to convert rotary motion of the rotation cylinder member into axial linear motion of the piston to thereby press and move the piston toward the brake disc side; and
a return spring which is arranged coaxially with the rotation cylinder member along a radially inner circumferential surface of the rotation cylinder member, and which biases the piston in a direction away from the brake disc.

2. The brake caliper according to claim 1, wherein the piston is formed with a diameter greater than that of the rotation cylinder member, and on the radially outer side of the rotation cylinder member there is provided a guide member which restricts rotation of the piston with respect to the caliper body, and which guides movement of the piston in the axial direction.

3. The brake caliper according to claim 2, wherein on an end portion of the rotation cylinder member on the piston side, there is formed a flange portion which extends outward with respect to the radial direction, and on a surface of this flange portion which faces the piston side, there is formed an action portion for causing the piston to perform linear motion; and an opposite side surface of the flange portion which faces the piston side, within the caliper body, opposes a part of the caliper body, and between this one part and the opposite side surface there is provided a thrust bearing.

4. The brake caliper according to claim 3, wherein the conversion mechanism is configured and arranged such that:
a rolling body is retained between a circumferential groove which is the action portion of the rotation cylinder member, and a circumferential groove formed in the piston;
and at least one of the circumferential groove formed in the rotation cylinder member and the circumferential groove formed in the piston has a sloped surface which changes the groove depth with respect to a circumferential direction of the piston.

5. The brake caliper according to claim 3, wherein:
the conversion mechanism has a movable member which moves integrally with the piston when converting rotary motion of the rotation cylinder member into axial linear motion of the piston;
and the piston and the movable member are threadably coupled and thereby integrated, and an amount of projection of the piston toward the brake disc side with respect to the movable member is adjusted by rotating the piston relatively to the movable member.

6. The brake caliper according to claim 5, wherein the conversion mechanism is configured and arranged such that:
a rolling body is retained between a circumferential groove which is the action portion of the rotation cylinder member, and a circumferential groove formed in the movable member;
and at least either one of the circumferential groove formed in the rotation cylinder member and the circumferential groove formed in the movable member has a sloped surface which changes the groove depth with respect to a circumferential direction of the piston.

7. The brake caliper according to claim 4, wherein the rolling body, the rotation cylinder member, and the return spring are arranged in a manner so that at least part of the rolling body overlaps with the guide member in the radial direction of the piston.

8. The brake caliper according to claim 1, wherein the return spring is arranged so that the entire length thereof is housed within the inner side of the rotation cylinder member with respect to the axial direction.

9. The brake caliper according to claim 1, wherein the operating element and the rotation arm are connected by a wire, and there is provided an adjustment mechanism which is configured to selectively adjust the length of the wire between the operating element and the rotation arm.

10. The brake caliper according to claim 2, wherein on an end portion of the rotation cylinder member on the piston side, there is formed a flange portion which extends outward and inward with respect to the radial direction, and on a surface of this flange portion which faces the piston side, there is formed an action portion for causing the piston to perform linear motion; and an opposite side surface of the flange portion which faces the piston side locks one end portion of the return spring.

11. The brake caliper according to claim 2, wherein on an end portion of the rotation cylinder member on the piston side, there is formed a flange portion which includes an outer flange portion and an inner flange portion each extending outward and inward with respect to the radial direction, and on a surface of this flange portion which faces the piston side, there is formed an action portion for causing the piston to perform linear motion; and an opposite side surface of the outer flange portion which faces the piston side, within the caliper body, opposes a part of the caliper body, and between this one part and the opposite side surface there is provided a thrust bearing, and an opposite side surface of the inner flange portion which faces the piston side locks one end portion of the return spring.

12. The brake caliper according to claim 10, wherein the conversion mechanism is configured and arranged such that:
a rolling body is retained between a circumferential groove which is the action portion of the rotation cylinder member, and a circumferential groove formed in the piston;

and at least one of the circumferential groove formed in the rotation cylinder member and the circumferential groove formed in the piston has a sloped surface which changes the groove depth with respect to a circumferential direction of the piston.

13. The brake caliper according to claim 12, wherein the rolling body, the rotation cylinder member, and the return spring are arranged in a manner so that at least part of the rolling body overlaps with the guide member in the radial direction of the piston.

14. The brake caliper according to claim 10, wherein the operating element and the rotation arm are connected by a wire, and there is provided an adjustment mechanism which is configured to selectively adjust the length of the wire between the operating element and the rotation arm.

* * * * *